(12) United States Patent
Hincapie et al.

(10) Patent No.: US 11,232,587 B2
(45) Date of Patent: Jan. 25, 2022

(54) USE OF IMAGE SENSORS TO QUERY REAL WORLD FOR GEO-REFERENCE INFORMATION

(71) Applicant: Google LLC, Mountain View, CA (US)

(72) Inventors: Juan David Hincapie, Palo Alto, CA (US); Andre Le, San Francisco, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 16/757,638

(22) PCT Filed: Nov. 6, 2019

(86) PCT No.: PCT/US2019/060061
§ 371 (c)(1),
(2) Date: Apr. 20, 2020

(87) PCT Pub. No.: WO2021/091552
PCT Pub. Date: May 14, 2021

(65) Prior Publication Data
US 2021/0134003 A1    May 6, 2021

(51) Int. Cl.
*G06T 7/73*     (2017.01)
*G06K 9/00*     (2006.01)
*G06F 16/9032*  (2019.01)

(52) U.S. Cl.
CPC ............ *G06T 7/73* (2017.01); *G06F 16/9032* (2019.01); *G06K 9/00671* (2013.01); *G06K 9/00677* (2013.01); *G06T 2207/30244* (2013.01)

(58) Field of Classification Search
CPC ........... G06K 9/00671; G06K 9/00677; G06K 9/4604; G06K 9/4609; G06K 9/6201;
(Continued)

(56) References Cited

U.S. PATENT DOCUMENTS 8,810,599 B1   8/2014  Tseng
9,432,421 B1   8/2016  Mott et al.
(Continued)

OTHER PUBLICATIONS

International Search Report and Written Opinion for International Application No. PCT/US2019/060061 dated May 8, 2020. 12 pages.

*Primary Examiner* — Andrew W Johns
(74) *Attorney, Agent, or Firm* — Lerner, David, Littenberg, Krumholz & Mentlik, LLP

(57) ABSTRACT

The present disclosure provides systems and methods that makes use of one or more image sensors of a device to provide users with information relating to nearby points of interest. The image sensors may be used to detect features and/or objects in the field of view of the image sensors. Pose data, including a location and orientation of the device is then determined based on the one or more detected features and/or objects. A plurality of points of interest that are within a geographical area that is dependent on the pose data are then determined. The determination may, for instance, be made by querying a mapping database for points of interest that are known to be located within a particular distance of the location of the user. The device then provides information to the user indicating one or more of the plurality of points of interest.

20 Claims, 11 Drawing Sheets

(58) Field of Classification Search
CPC .......... G06K 9/6202; G06T 7/70; G06T 7/73; G06T 7/74; G06T 2207/30244; G06F 16/9032

See application file for complete search history.

(56) References Cited

U.S. PATENT DOCUMENTS

| | | | |
|---|---|---|---|
| 2008/0167814 A1* | 7/2008 | Samarasekera et al. | H04N 13/239 701/469 |
| 2011/0135207 A1 | 6/2011 | Flynn et al. | |
| 2012/0249797 A1* | 10/2012 | Haddick et al. | G06F 3/016 348/158 |
| 2014/0300775 A1* | 10/2014 | Fan et al. | H04N 1/32128 348/231.3 |
| 2020/0097726 A1* | 3/2020 | Gurule | H04N 21/25841 |

* cited by examiner

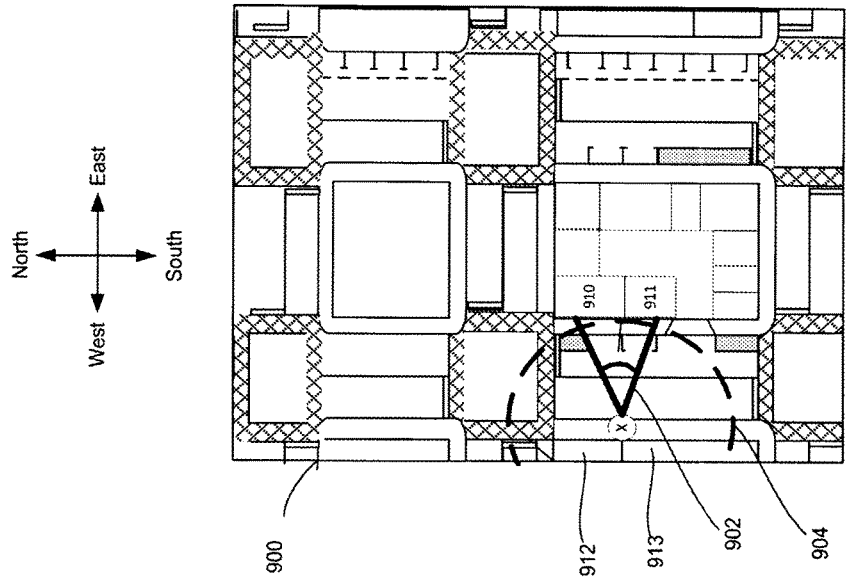
FIG. 9
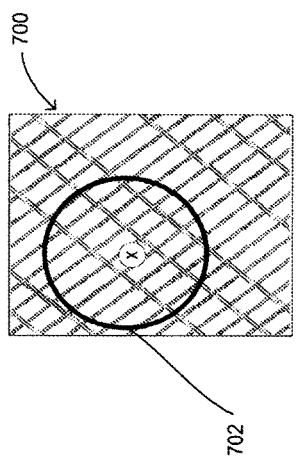
FIG. 7
FIG. 8

USE OF IMAGE SENSORS TO QUERY REAL WORLD FOR GEO-REFERENCE INFORMATION

CROSS-REFERENCE TO RELATED APPLICATION

This application is a national phase entry under 35 U.S.C. § 371 of International Application No. PCT/US2019/060061, filed Nov. 6, 2019, the entire disclosure of which is incorporated herein by reference.

BACKGROUND

Many devices, including smartphones and smartwatches, provide for geographic location searching. Each device may be connected to a network that allows for querying points of interest. Typically, a user must provide an input, such as text in a search field or a voice command, to query for points of interest. A user may have to provide multiple inputs, such as multiple interactions with the display, text input, etc., to obtain information regarding points of interest.

Existing image-matching-based search tools may perform a search for a point of interest within an image of a geographical area that has been captured using, for instance, a portable device of the user. The image-matching-based searching tools may compare the captured image, or features extracted from the captured image, with one or more previously captured images of the environment, or features extracted therefrom. In this way, objects, structures etc. within the captured image may be recognized as a point of interest e.g. building, landmark etc., that is known to be present in the previously captured image(s) (e.g. by virtue of a stored association between the previously captured image(s) and the point of interest). Information relating to the point of interest that is determined to be present in the captured image may then be output via the user's device. Such image matching may be computationally intensive. In addition, the image capture aspect of the tool may require use of the device screen (so the user can verify what has been captured) as well as the associated power/processing requirements. It may also require a relatively precise and time-consuming user-device interaction in which the user has to activate the camera and then appropriately frame the image so as to properly capture the point of interest about which they require information.

BRIEF SUMMARY

One aspect of the disclosure provides for a system for providing information indicating one or more points of interest. For example, the system may include one or more processors configured to detect one or more features captured by the one or more image sensors based on data derived from use of one or more image sensors of a user device, determine pose data including a location and orientation of the device based on at least the one or more detected features, determine a plurality of points of interest within a particular geographical area that is determined based on the pose data, and provide information indicating one or more of the plurality of points of interest via the user device.

The geographic area may be within a predefined distance of the location of the device included in the pose data. The geographic area may be within a pre-defined angular range that is based on the orientation of the device included in the pose data. The predefined angular range may be wider than a field of view of the one or more image sensors. The one or more image sensors may be located on an edge of the user device.

The plurality of points of interest may be determined by querying a mapping database for points of interest within the particular geographic area. The plurality of points of interest are determined by querying the mapping database for points of interest within a particular range from the location, and the returned points of interest are filtered such that points of interest outside an angular range that is centered on the orientation of the device are excluded.

Another aspect of the disclosure provides for a method for providing information indicating one or more points of interest. The method includes deriving, using one or more processors, data from one or more image sensors. The method includes detecting, using the one or more processors and based on derived data, one or more features in a particular geographical area, determining, using the one or more processors and based on at least the one or more detected features, pose data including a location and orientation of the device, determining, using the one or more processors and based on the pose data, a plurality of points of interest within the particular geographical area, and providing, using the one or more processors, information indicating one or more of the plurality of points of interest in response to detecting features.

Yet another aspect of the disclosure provides for a non-transitory computer-readable medium storing instructions, which when executed by one or more processors, cause the processors to derive data from one or more image sensors of a user device, detect one or more features in a particular geographical area based on the derived data, determine pose data including a location and orientation of the device based on at least the one or more detected features, determine a plurality of points of interest within the particular geographical area based on the pose data, and provide information indicating one or more of the plurality of points of interest in response to detecting features.

BRIEF DESCRIPTION OF THE DRAWINGS

FIG. 7 is a pictorial diagram of a map determining the location of the device according to aspects of the disclosure.

FIG. 8 is a pictorial diagram of a map determining the pose data of the device according to aspects of the disclosure.

FIG. 9 is a pictorial diagram of a map determining a query area according to aspects of the disclosure.

DETAILED DESCRIPTION

The present disclosure relates to a system that provides information relating to one or more nearby points of interest in response to sensor data from one or more image sensors. More specifically, the image sensors detect features and/or objects, such as, but not limited to, the outline of structures such as buildings or bridges, in the field of view of the image sensors. Pose data, including a location and orientation of the device is determined based on the one or more detected features and/or objects. The pose data may be determined, for instance, by comparing the detected features and/or objects to features stored in an index or database. Such an index may be referred to as a visual positioning system (VPS) index and may have been generated based on a collection of "street-level" images.

A plurality of points of interest within a geographical area may be determined based on the pose data. The determination may, for instance, be made by querying a mapping database for points of interest that are known to be located within a particular distance of the location of the device and, therefore, the user. The device may provide information to the user indicating one or more of the plurality of points of interest.

Figure 1:
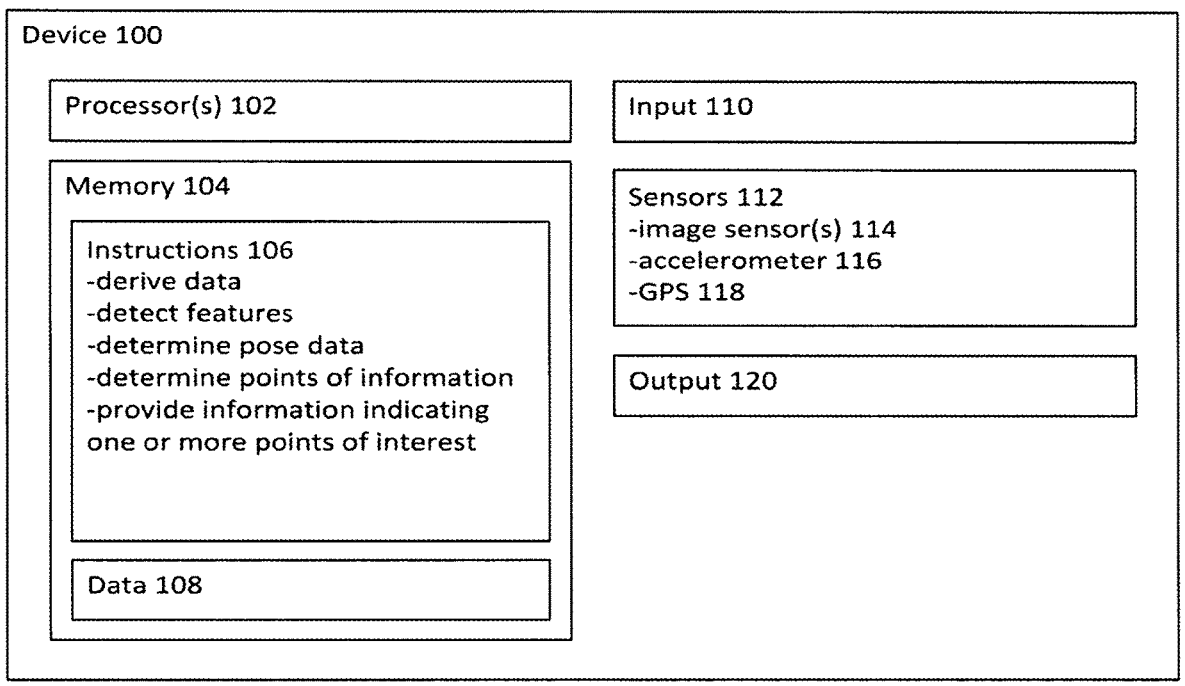
FIG. 1 is a block diagram illustrating an example device according to aspects of the disclosure.

FIG. 1 provides an example block diagram illustrating components of the device. As shown, the device 100 includes various components, such as one or more processors 102, memory 104, and other components typically present in microprocessors, general purpose computers, or the like. Device 100 also includes input 110, an output 120, and sensors 112. The sensors may include one or more image sensors 114, an accelerometer 116, and a global positioning system ("GPS") sensor 118.

The one or more processors 102 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of device 100 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 100. Accordingly, references to a processor or computing device will be understood to include references to a collection of processors or computing devices or memories that may or may not operate in parallel.

Memory 104 may store information that is accessible by the processors 102, including instructions 106 that may be executed by the processors 102, and data 108. The memory 104 may be of a type of memory operative to store information accessible by the processors 102, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 106 and data 108 are stored on different types of media.

Data 108 may be retrieved, stored or modified by processors 102 in accordance with the instructions 106. For instance, although the present disclosure is not limited by a particular data structure, the data 108 may be stored in computer registers, in a relational database as a table having a plurality of different fields and records, XML documents, or flat files. The data 108 may also be formatted in a computer-readable format such as, but not limited to, binary values, ASCII or Unicode. By further way of example only, the data 108 may be stored as bitmaps comprised of pixels that are stored in compressed or uncompressed, or various image formats (e.g., JPEG), vector-based formats (e.g., SVG) or computer instructions for drawing graphics. Moreover, the data 108 may comprise information sufficient to identify the relevant information, such as numbers, descriptive text, proprietary codes, pointers, references to data stored in other memories (including other network locations) or information that is used by a function to calculate the relevant data.

The instructions 106 can be any set of instructions to be executed directly, such as machine code, or indirectly, such as scripts, by the processor 102. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The device 100 may further include an input 110. The input 110 may be, for example, a touch sensor, dial, button, or other control for receiving a manual command. The input 110 may, in some examples, be a microphone. The device 100 may also include an output 120. The output 120 may be, for example, a speaker.

Device 100 may include sensors 112. The sensors 112 may be one or more image sensors 114 for detecting features and/or objects around the device 100. The one or more image sensors 114 may convert optical signals into electrical signals to detect, or capture, features and/or objects around the device 100. The one or more image sensors may be, for example, a charge coupled device ("CCD") sensor or a complementary metal oxide semiconductor ("CMOS") sensor. The one or more processors 102 may process the features and/or objects detected by the one or more image sensors 114 to identify at least one detected feature and/or object as a point of interest. The one or more image sensors 114 may be located on at least one edge of the device 100. In some examples, the one or more image sensors 114 may be located on the back of the device 100.

The sensors 112 may also include an accelerometer 116. For example, the accelerometer 116 may determine the pose or orientation of the device 100. According to some examples, the device 100 may identify the orientation based on the device's internal compass and the gravity vector based on the device's internal accelerometer 116. Sensors 112 may further include GPS sensors 118 or other positioning elements for determining the location of device 100. The location of the device may be the latitudinal and longitudinal coordinates of the device 100.

It should be understood that the device 100 may include other components which are not shown, such as a battery, charging input for the battery, signals processing components, etc. Such components may also be utilized in execution of the instructions 106.

Figure 2:
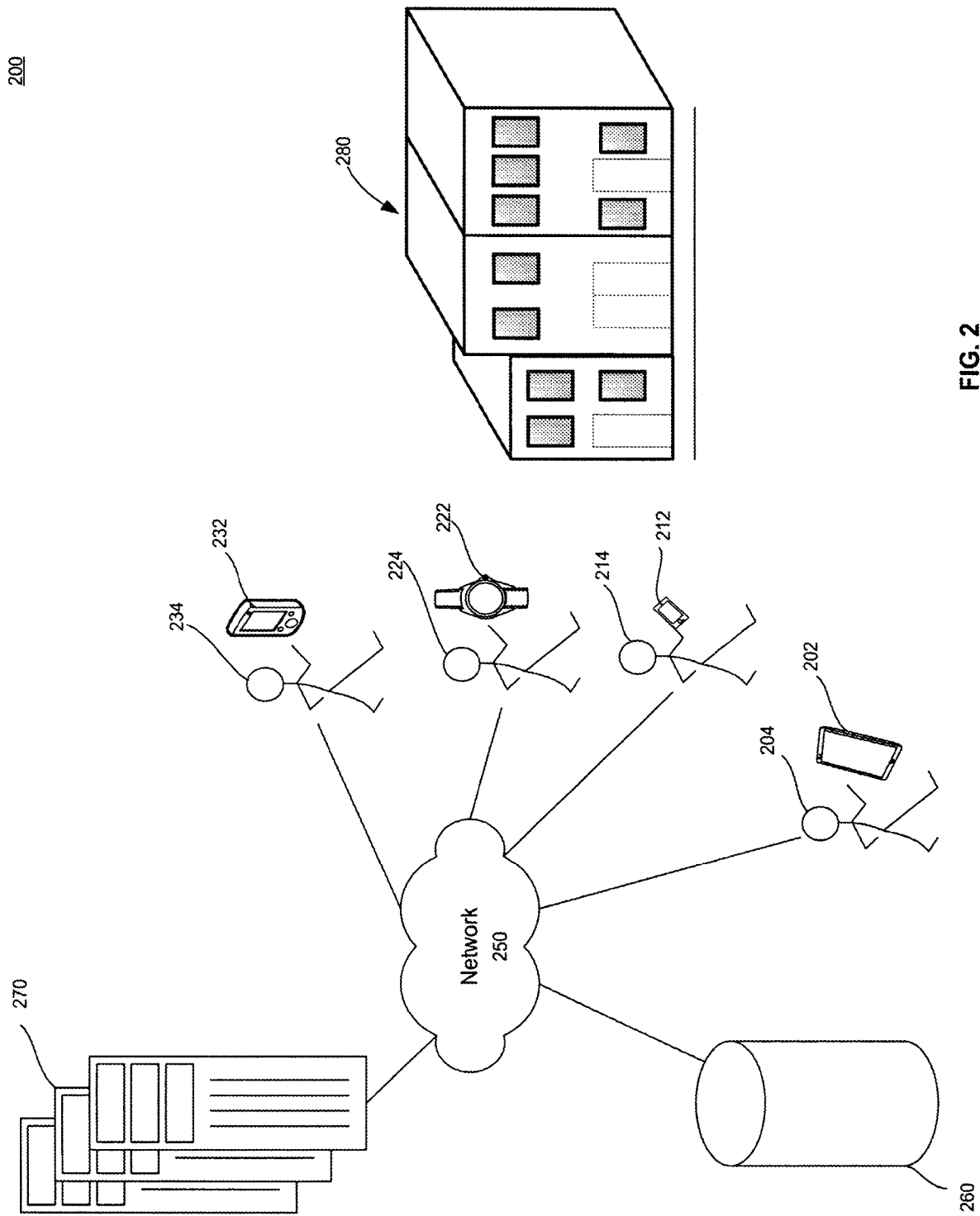
FIG. 2 is a functional diagram of an example system according to aspects of the disclosure.

FIG. 2 illustrates an example system 200 in which the features described herein may be implemented. It should not be considered limiting the scope of the disclosure or usefulness of the features described herein. In this example, system 200 may include a plurality of devices 202, 212, 222, 232, users 204, 214, 224, 234, server computing device 270, storage system 260, and network 250. For purposes of ease, the collection of devices 202, 212, 222, 232 or a single device will be referenced as device(s) 202. Further, also for purposes of ease, the group of users 204, 214, 224, 234 and a single user will be referenced as user(s) 204.

Each device 202 may be a personal computing device intended for use by a respective user 204 and have all of the components normally used in connection with a personal computing device, as described above with relationship to device 100, including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The devices 202 may also include a camera, speakers, a network interface device, and all of the components used for connecting these elements to one another. As mentioned above, the devices 202 may further include the image sensors. The image sensors may capture features and/or object of a plurality of points of interest 290. Device 202 may be capable of wirelessly exchanging and/or obtaining data over the network 250.

Although the devices 202 may each comprise mobile computing devices capable of wirelessly exchanging data with a server over a network such as the Internet, they may alternatively comprise a full-sized personal computing device. By way of example only, devices may be mobile phones or devices such as a wireless-enabled PDA, a tablet PC, a wearable computing device (e.g., a smartwatch, headset, smartglasses, virtual reality player, other head-mounted display, etc.), or a netbook that is capable of obtaining information via the Internet or other networks.

The devices 202 may be at various nodes of a network 250 and capable of directly and indirectly communicating with other nodes of network 250. Although four (4) devices are depicted in FIG. 2, it should be appreciated that a typical system 200 can include one or more devices, with each computing device being at a different node of network 250. The network 250 and intervening nodes described herein can be interconnected using various protocols and systems, such that the network can be part of the Internet, World Wide Web, specific intranets, wide area networks, or local networks. The network 250 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 200 may include one or more server computing devices having a plurality of computing devices, e.g., a load balanced server farm, that exchange information with different nodes of a network for the purpose of receiving, processing and transmitting the data to and from other computing devices. For instance, one or more server computing devices 270 may be a web server that is capable of communicating with the one or more devices 202 via the network 250. In addition, server computing device 270 may use network 250 to transmit and present information to a user 204 of one of the other devices 202.

Server computing device 270 may include one or more processors, memory, instructions, and data. These components operate in the same or similar fashion as those described above with respect to device 100.

Storage system 260 may store various types of information. For instance, the storage system 260 may store information about points of interest, such as publically accessible ratings, map data, etc. The storage system 260 may store map data. The map data may include, for instance, locations of points of interest. This information may be retrieved or otherwise accessed by a service computing device, such as one or more server computing devices 270, in order to perform some or all of the features described herein.

Figure 3:
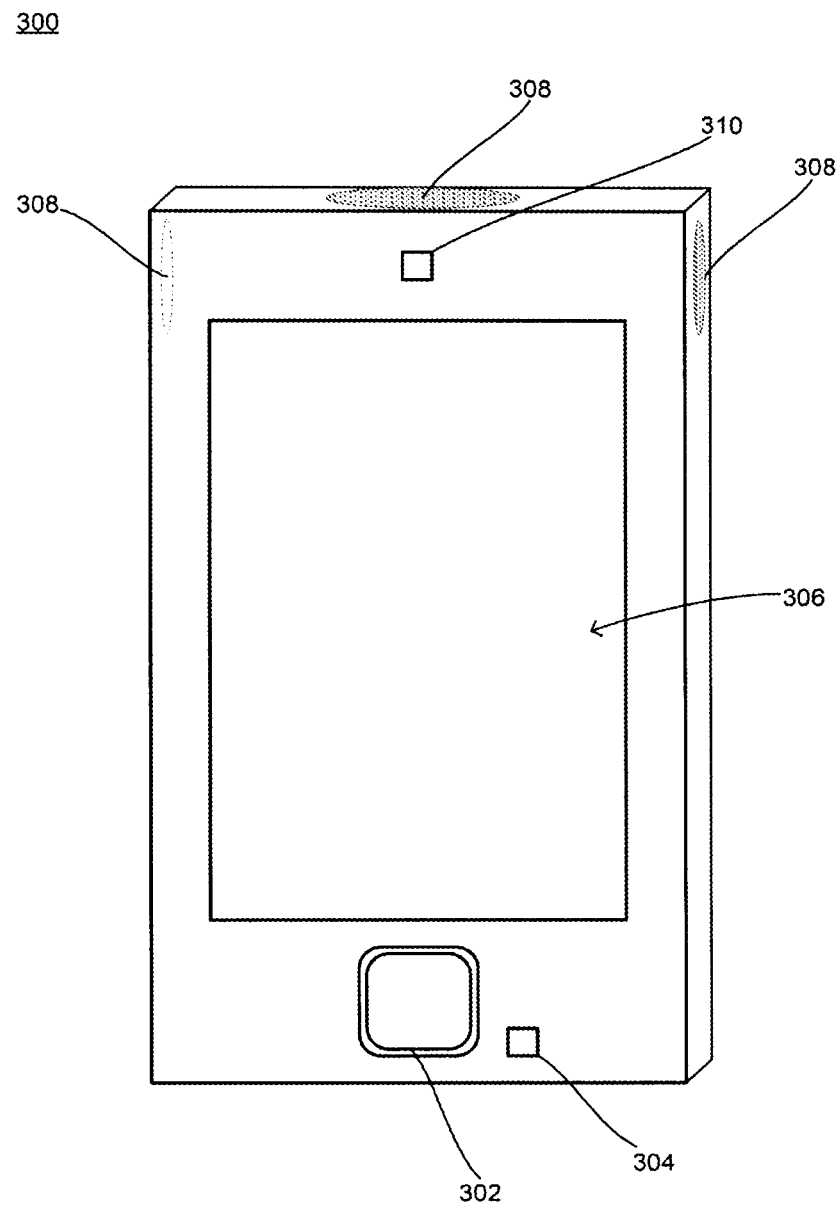
FIG. 3 is a perspective drawing of an example device according to aspects of the disclosure.

FIG. 3 illustrate an example device 300. While in this example the device 300 is a mobile phone it should be understood that in other examples the device may be any of a variety of different types. The device 300 may include input, a display, sensors, internal electronics, and output.

The input may include a user input 302, such as those described with respect to device 100. The input may include a microphone 304 for receiving a verbal command or audio input.

The display 306 may be any type of display, such as a monitor having a screen, a touch-screen, a projector, or a television. As shown in FIG. 3, the display may be a touch-screen of a mobile device. The display 306 of the device 300 may electronically display information to a user via a graphical user interface ("GUI") or other types of user interfaces. For example, as will be discussed below, display 306 may electronically display information corresponding to points of interest surrounding a user.

The sensors may include image sensors 308, including those described with respect to device 100. In some implementations, the image sensors 308 may be provided on the edge of the device. The image sensors may be positioned such that when the device is in use, such as when a user is holding the device and viewing its display, a field of view of the image sensors 308 includes objects surrounding the device. For example, the field of view may include objects in front of the user. With the image sensors 308 on the edge, for instance, a top edge, of the device 300, the image sensors 308 may be naturally pointing away from the user and in the direction of prominent features and/or objects when the device 300 is being held by the user. While three (3) image sensors 308 are shown, the device 300 may have any number of image sensors 308. Further, while the image sensors 308 are depicted as being located on an edge of device 300, the image sensors 308 may be located elsewhere such as on the back of the device 300, the display 306 side of device 300, or as part of other image capturing mechanisms. Thus, the number and location of image sensors 308 shown in FIG. 3 is not meant to be limiting.

The user can enable or disable image sensing by the image sensors 308, and the device may only detect the features and/or objects if the user has enabled this feature. According to some examples, the user may set the image sensors 308 to automatically disable in particular locations, such as familiar locations. As another example, the user may define parameters that only enable image sensing in particular locations or settings, such as outdoors.

The image sensors 308 may be any sensors capable of receiving imagery. The image sensors 308 may capture features and/or objects that are within the field of view of the image sensors 308. Information regarding the captured features/objects may be used to determine further information, such as pose information, nearby points of interest, etc.

While three image sensors 308 are illustrated in FIG. 3, it should be understood that additional or fewer image sensors may be included. Moreover, a position of the image sensors along an edge or back of the device may be varied. As the number and position of the image sensors is varied, the field of view of the sensors may also vary.

The captured features and/or objects need not be displayed on the display 306 of device 300. According to some examples, the features and/or objects that are captured by the image sensors 308 may never leave the firmware and, therefore, may not be saved as a picture or image to device 300.

The sensors may further include GPS sensors. The GPS sensors may provide a rough indication as to the location of the device. The features captured by image sensors 308 may be used to refine the location indicated by the GPS sensors or vice versa. According to some examples, the GPS data may be used to determine which part of the visual positioning system ("VPS") index should be considered when determining the pose data. The VPS may indicate where different parts of the index correspond to different locations.

The sensors may additionally include accelerometers. The accelerometers may determine the pose or orientation of the device. Further, the sensors may include a gyroscope. The processors may receive gyroscope data and may process the gyroscope data in combination with the data collected from each of the other sensors to determine the orientation of the device. In some examples, the gyroscope data alone may be enough for the processors to determine the orientation of the device.

The internal electronics may include, for example, one or more processors or other components adapted to processes the features or objects captured by the image sensors 308. The captured features or objects may be processed to determine pose data. The pose data may be based on key or prominent features captured by the image sensors 308. The detected features and/or objects may be used in combination with GPS readings and/or accelerometer or other sensor readings to determine the pose data for the device. Pose data may include the location of the device, such as the coordinates, and the orientation of the device, such as which direction the image sensor 308 and, by extension, the device 300 and/or user is facing.

The pose data may be used to determine a plurality of points of interest within the area surrounding the device and, by extension, the user. The internal electronics may provide information regarding the points of interest to the user, for instance, on the display 306 of device 300.

The output 310 may include one or more speakers for outputting audio, such as playback of music, speech, or other audio content. According to some embodiments, the output may also be the display 306.

Figure 4:
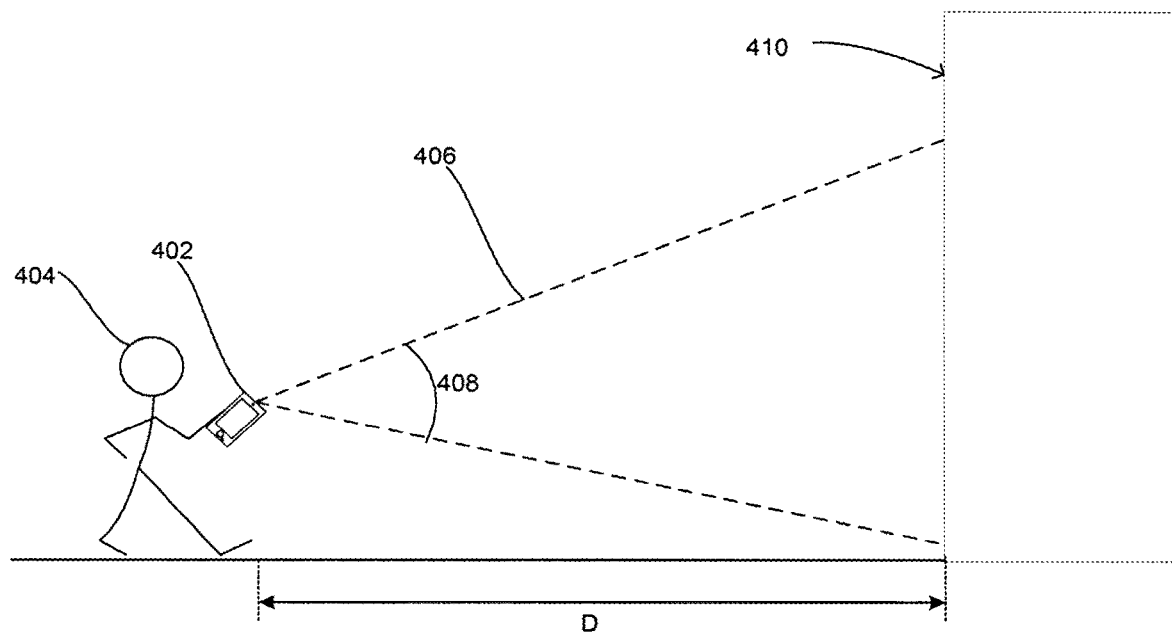
FIG. 4 is a pictorial diagram illustrating use of the example device according to aspects of the disclosure.

FIG. 4 illustrates an example where the user is holding the device and the image sensors are capturing features and/or objects in the field of view of the image sensors. The device 402 may be similar to device 300 described herein. The user 404 may be a distance "D" away from a point of interest 410. The image sensors, while not shown, may be located at a top edge of the device 402. Thus, as the user 404 holds device 402, the image sensor may capture features and/or objects that are in the field of view of the user 404.

The image sensors may capture, for instance, permanent and/or distinctive structures, such as bus stops, buildings, parks, etc. More distinctive features may be useful for characterizing the device's location/orientation and permanent features may be more likely to be represented in the VPS index that is generated based on previously captured images. Conversely, features that are captured by the image sensors that are less distinctive and/or more transient, such as people, sidewalks, cars, trees, and roads, may be disregarded for the purpose of determining the pose data. Less distinctive features may be less likely to assist in determining the location and orientation of the device and transient features are less likely to be represented in the VPS index. In some implementations, machine learning may be used to determine which features to make use of for determining pose data and which features to disregard. In some examples, the points of interest may be determined based on the orientation of the device as indicated by the pose data. For instance, the points of interest may be selected from points of interest that are within the particular range of the user device location and which are within a particular angular range or range or orientations that is based on the orientation of the device.

Each of the image sensors may have a vertical field of view. FIG. 4 illustrates a vertical field of view 406 for the image sensor located on the top edge of the device. The vertical field of view 406 may be defined by a predetermined angle 408. In some examples, the vertical field of view 406 may be determined by an aperture of the image sensor. As shown in FIG. 4, the image sensor, based on the vertical field of view 406, may not capture the entire height of the point of interest 410.

Within the vertical field of view 406 may be a vertical field of view search angle. According to some examples, the vertical field of view search angle may dynamically change in size depending on whether the device is closer to or farther away from the features and/or objects the image sensors are pointing at. The vertical field of view search angle may increase when the distance D is smaller, such as when the image sensors are closer to the features and/or objects, in order to be able to capture more features and/or objects. The vertical field of view search angle may decrease when the distance D is larger, such as when the image sensors are farther away from the features and/or objects, in order to limit the amount of features and/or objects that will be captured. The vertical field of view search angle may be the same angle as angle 408. In some examples, the vertical field of view search angle may be more or less than angle 408.

Figure 5:
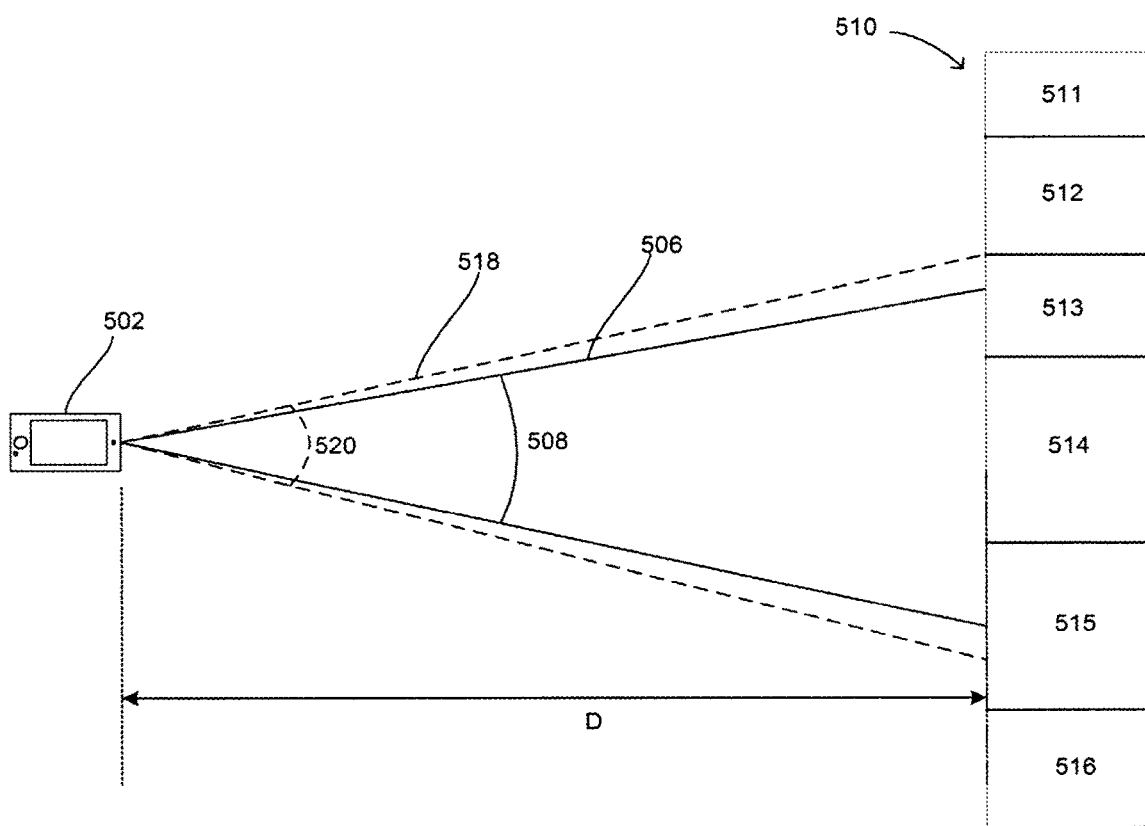
FIG. 5 is a pictorial diagram illustrating a field of view of the device according to aspects of the disclosure.

FIG. 5 illustrates an example of a horizontal field of view of the device. Similar to the device shown in FIG. 4, the image sensor may be located on a top edge of device 502. The image sensor may have a horizontal field of view 506. The horizontal field of view 506 may be measured by a predetermined angle 508. The angle 508 may be centered based on the orientation of the device 502. According to some examples, the predetermined angle 508 may be 30 degrees. In some examples, the angle 508 may be more than 30 degrees or less than 30 degrees. This may serve to provide indication of points of interest that are within the field of view of the user.

Within the horizontal field of view 506 may be a horizontal point of interest search angle. The horizontal point of interest search angle may change in size based on the location of the device as compared to the features and/or objects of interest. For example, the horizontal point of interest search angle may dynamically change depending on whether the image sensors are closer to or farther away from the features and/or objects the image sensors are pointing at. The horizontal point of interest search angle may increase when the distance D is smaller, such as when the image sensors are closer to the features and/or objects, in order to be able to capture more features and/or objects. The horizontal point of interest search angle may decrease when the distance D is larger, such as when the image sensors are farther away from the features and/or objects, in order to limit the amount of features and/or objects that will be captured. The horizontal field of view search angle may be the same angle as angle 508. In some examples, the horizontal field of view search angle may be more or less than angle 508.

When the image sensors are capturing features and/or objects in the field of view 506, the internal electronics of the device 502 may provide pose correction for natural pointing offsets. For example, when the image sensors are pointing in a direction of a point of interest, the point of interest may lay outside the field of view 506 due to user error, such as aiming inaccuracies. In some implementations, the search angle may be extended, for instance, beyond an angular range corresponding to the field of view of the image sensors. This may serve to compensate for the user's inaccuracy in pointing the image sensor at the point of interest. For example, the field of view 506 may increase the search angle by a predetermined amount, as shown by the increased angle 520. According to some examples, the angle 508 may increase by 10 degrees to angle 520. An increase of 10 degrees is merely an example. The search angle may increase from field of view angle 508 may increase by 2 degrees, 5 degrees, 7.5 degrees, 20 degrees, etc. Therefore, in some examples, there may be a larger field of view 518 for search purposes than the field of view 516 of the image sensors.

As shown in FIG. 5, there may be a plurality of points of interest 510 within the field of view. The points of interest 510 may include a museum, a bar, cafe, or restaurant, a food stand, a store, a medical facility, landmark, or any other location. As illustrated in FIG. 5, there may be a row of buildings 511-516, corresponding to a plurality of points of interest, next to each other. The field of view 506 of the image sensor may only capture buildings 513-515. When searching the area for locations of interest based on the features and/or objects captured by the image sensors and the pose data of the device, the field of view 508 may increase such that the search area corresponds to search angle 518, thereby capturing buildings 512-515. The processors of device 502 may increase the search angle from field of view 508 based on the distance between the device and the plurality of points of interest within the field of view 508 to provide for pose correction for natural pointing offsets.

Figure 6B:
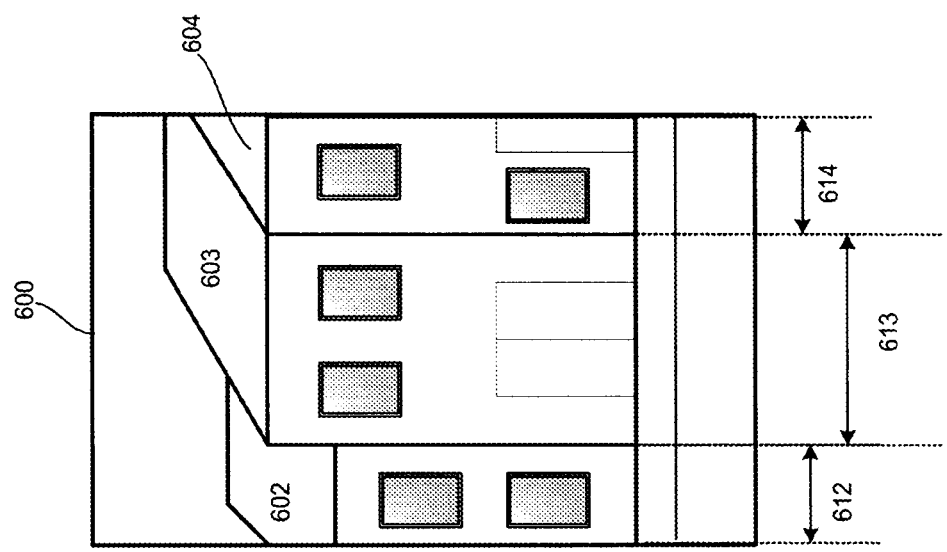
FIGS. 6A-6B illustrate features and/or objects captured by images sensors according to aspects of the disclosure.
Figure 6A:
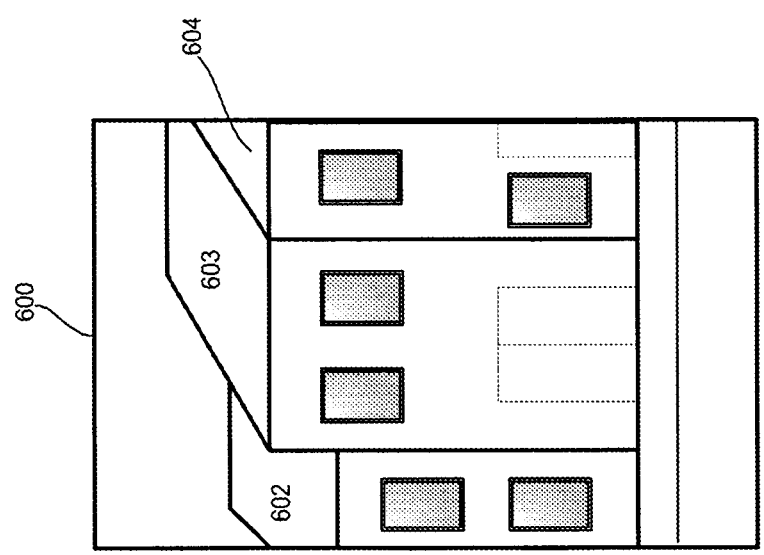

FIGS. 6A and 6B illustrate examples of capturing and analyzing objects to determine the points of interest. As shown in FIG. 6A, the image sensors may capture features and/or objects in the field of view of the image sensors. The captured 600 buildings 602-604 may be the prominent features and/or objects in the field of view. As discussed herein, less distinctive features, such as sidewalks, cars, trees, and people, may by disregarded as they may be less likely to assist in determining the location and orientation of the device and, therefore, the points of interest. In some examples, the captured 600 features and/or objects may not be displayed to the user. The captured 600 features and/or objects may not be saved to the device.

FIG. 6B illustrates an example of how the features and/or objects in the search angle within the field of view are analyzed. For example, the captured 600 buildings 602-604 may be analyzed to determine the amount of space that each of the buildings 602-604 take up in the field of view. In some examples, the device may determine each of the buildings 602-604 has a respective width 612-614 in the search angle within the field of view. The width may be considered when determining the points of interest captured by the image sensors. For example, the points of interest, i.e. buildings 602-604, may be considered based on their respective widths 612-614 instead of just a single point captured by the image sensor. Using FIG. 6B as an example, width 613 of building 603 is completely within the search angle within the field of view of the image sensor and is the largest width captured by the image sensor. Building 604 has a width 614 that is smaller than width 613 but larger than width 612 of building 602. The respective widths 612-614 may be used to determine a rank of the likely points of interest. For example, the point of interest that takes up the most width in the search angle within the field of view of the image sensor may indicate that that point of interest was what the image sensor was pointed at.

FIG. 7 illustrates an example of the location of the device. The GPS sensors, along with the accelerometers, image sensors, and any other sensors, may determine the location of the device. For example, the sensors may determine that the device is at location X, corresponding to a certain position on map 700. However, due to uncertainties in the sensors, the location of the device may be identified as location X and a surrounding radius 702. The radius 702 may compensate for the uncertainty of the device's exact location and provide a greater search area when determining the plurality of points of interest.

FIG. 8 illustrates an example of determining the pose data of the device. The pose data may include the location of the device and the orientation of the device. The sensors may determine the direction the image sensors are pointing. The image sensors may have a field of view angle 802. For example, if the sensors determine that the device is at location X, as shown on map 800, the features and/or objects detected by the images sensors, in combination with the GPS sensor readings and accelerometer readings, may determine the orientation of the device. For example, the accelerometer may determine whether the device has been rotated from a portrait position to a landscape position. The sensors may, therefore, determine that the image sensors are pointing in a certain direction, such as due East.

FIG. 9 illustrates an example of a query based on the pose data of the device. One directional and/or multi-directional querying may be performed to determine the points of interest in the field of view of the image sensors. The system may perform either or both the one directional query and multi-directional query.

One directional query may be used when the device and, therefore, the image sensors are far away from the point of interests 910, 911. The one directional query may use only the features and/or objects within the search angle within the image sensors' field of view 902 to determine the plurality of points of interest 910, 911. For example, the device may be at location X, as shown on map 900. The image sensors may be pointed in a direction due East. As shown, location X of the device is across the street from points of interest 910, 911. Thus, according to some examples, the device may be far enough away from points of interest 910, 911 to only use one directional querying based on the search angle within the field of view 904 of the image sensors.

Multi-directional queries may be used when the device and, therefore, the image sensors are close to the points of interest. This approach may serve to compensate for the fact that the effect of inaccurate device/image sensor pointing is more pronounced the closer the points of interest are to the user. This may also compensate for the fact that, when close to the points of interest, not as many features and/or objects may be captured by the image sensors. The multi-directional query may be performed by searching the search angle within the field of view of the sensors, but also a radius surrounding the location of the device. For example, it may be determined that location X is too close to any particular points of interest to determine what point of interest to identify. The device may use multi-directional querying to search the area 904 surrounding location X when determining the points of interest. The multi-directional query may identify points of interest 910, 911, which are in the search angle within the field of view 902 of the image sensors. In some examples, the multi-directional query may also identify points of interest 912, 913 which are not in the search angle within the field of view 902 of the image sensors but may be, instead, behind the image sensors.

According to some examples, multi-directional querying comprises indicating points of interest that are within a first area defined by a first distance from the device location and a first angular range, in addition to points of interest that are within a second area defined by a second distance from the device location, that is greater than the first distance, and a second angular range that is narrower than the first angular range. According to one example, the first angular range may be between 120 and 360 degrees and the first distance may be between 1 and 10 meters. In contrast, the second angular range may be between 20 and 50 degrees and the second distance may be between 10 and 400 meters. In some examples, the first angular range may be between 90 and 300 degrees and the first distance may be between 0.5 and 8 meters; the second angular range may be between 12.5 and 45 degrees and the second distance may be between 8 and 350 meters. These examples are not meant to be limiting as the angular ranges and distances may be based on the number and position of the image sensors and the specifications of the image sensors.

Based on the features and/or objects captured by the image sensor, the pose data of the device and the location of the device, a plurality of points of interest may be identified and provided to the user. According to some examples, the points of interest may be ranked and provided for display in order of relevance. For instance, after the plurality of points of interest within the particular geographical area has been determined, relevance weights for the points of interest may be calculated. The relevance weight may be used to rank the points of interest based on one or more criteria. In this regard, for example, the highest ranking points of interest may be provided as output by the device. The relevance weights may be determined based on one or both of a distance from the location indicated by the pose data and a type of the point of interest. In some examples, a rating associated with the point of interest may also be taken into account. For instance, the relevance weights may be calculated with a formula such as:

$$\text{Weight} = (\text{Distance Group Factor} * 50) + (\text{Type Factor} * 10) + (\text{Rating Factor} * 2)$$

The distance group factor may be determined based on a predefined distance threshold between the device and the point of interest. For example, a point of interest that is between 0 m and 50 m from the device may have a distance group factor of 3. A point of interest that is between 50 m and 175 m from the device may have a distance group factor of 2. A point of interest that is more than 175 m away from the device may have a distance group factor of 1. The distances groups and, therefore, the factors provided are merely examples and thus can be defined by any ranges and any factor number. For example, a point of interest that is between 0 m and 100 m may have a distance group factor of 5 while a point of interest that is between 100 m and 160 m may have a distance group factor of 4. The distance thresholds, and therefore the distance group factor, may be defined based on the location of the device. For example, in a crowded city, the distance thresholds may decrease as points of interest may be closer together. In a rural area, the distance thresholds may increase as points of interest may be more spread apart. The distance factor may be determined using a linear clustering algorithm.

The type factor may be determined based on the type of location or establishment. For example, the device may consider whether the point of interest is a museum, a bar, cafe, or restaurant, a food stand, a store, a medical facility, landmark, or any other location. The device may learn what types of places are most likely to be queried and, therefore, give those types of places a higher type factor. For example, a museum may return a type factor of 4; a car, café, or restaurant may return a type factor of 3.5; a place that serves food but is not a bar, café or restaurant may have a type factor of 3; a store may have a type factor of 2.5; a medical facility, such as a doctor's office or dentist's office, may have a type factor of 2; any other point of interest that does not fall within the predefined types may have a type factor of 1. A type factor of 1 may also be used as a default type factor. In some examples, the type factor may be determined based on the percentage of space the point of interest takes up in the field of view. Thus, a museum or department store may have a type factor of 4 and a café may have a type factor of 2. The type factor may be determined based on whether the point of interest is see-through, such as a bus stop, or solid, such as a building. The type factors may change as the system learns what types of places users are most likely to query. For example, the system may perform machine learning to continuously update and change the type factors for each of the points of interest.

Points of interest that are within the same distance group and/or type group may be further ranked. For example, the relevance weight may include a further calculation with a formula such as:

$$\text{Within Group Relative Distance} = (1 - \text{Normalized Distance})$$

The normalized distance may be calculated using a formula such as:

$$\text{Normalized Distance} = \text{Minimum}(\text{Distance to User}, \text{Search Range}) / \text{Search Range}$$

In some examples, the Minimum may be a smallest value between the Distance to User and the Search Range. This may provide for consideration of the distance between objects while only provided a small weight to the distance.

The Distance to User may be determined by the linear or absolute distance between the device and the identified point of interest. For example, the linear distance may be considered the distance "as the crow flies," such that the distance does not follow the foot path or walking distance between the device and the point of interest. In some examples, the Distance to User may be determined by the distance the user would have to walk to arrive at the point of interest. For example, the user may have to follow traffic patterns and walk on sidewalks, and not through buildings.

The Search Range may be determined based on a range preset by the device, the operative system, the internal electronics, etc. For example, the Search Range may be a 100 meter radius around the determined location of device. Thus, when performing a one direction or multi-directional query, the search may only include points of interest within a 100 meter radius. The 100 meters is merely one example. The Search Range may be smaller or larger. For example, in crowded places, like a city, the Search Range may be smaller to limit the number of points of interest returned by the search. In less crowded places, such as a rural location, the Search Range may be larger to increase the number of points of interest returned by the search. The Search Range may change without user input. For example, the Search Range may change based on the determined location of the device.

The rating factor may be determined based on at least one user created rating of a place that is publically available. For example, the system may query internet review websites to determine a publicly available rating for each of the point of interest.

In some examples, the relevance weights may be further calculated based on line of sight, the normal vector of the point of interest, and angular size. The line of sight may include what the image sensors captures. Thus, the relevance weight may give more weight to a point of interest in the line of sight of the image sensors, and therefore the user, than a point of interest that is barely visible or not visible at all in the line of sight. The normal vector of the point of interest may take into account the angular measurement from the normal of the point of interest. The normal is the line taken perpendicular to the façade of the point of interest. Thus, the relevance weight may consider the angle from normal. The larger the angle from normal, the image sensors may be less likely to be pointing directly at the point of interest. The smaller the angle from normal, the image sensors may be more likely to be pointing directly at the point of interest. The angular size may include the size of the feature and/or object in the field of view, measured as an angle. This may, in some examples, be used to calculate how much of the field of view the feature and/or object occupies.

In yet other examples, the relevance weights may be further calculated based on a previous history of places the user has visited or ranked. A place that has been previously selected may be ranked higher. The relevance weights may be calculated based on points of interest having sales or specials. For example, if a department store is having a sale, the department store may be ranked higher than the big box store that is not having a sale. In some examples, points of interest that have an event that day, such as a theater or a concert venue, may be ranked higher based on the date and time of the vent. The calculation of the relevance weight may include the size of the façade of the point of interest in the field of view. For example, a façade that is larger may be more prominent in the field of view and, therefore, may be more relevant.

Figure 10A:
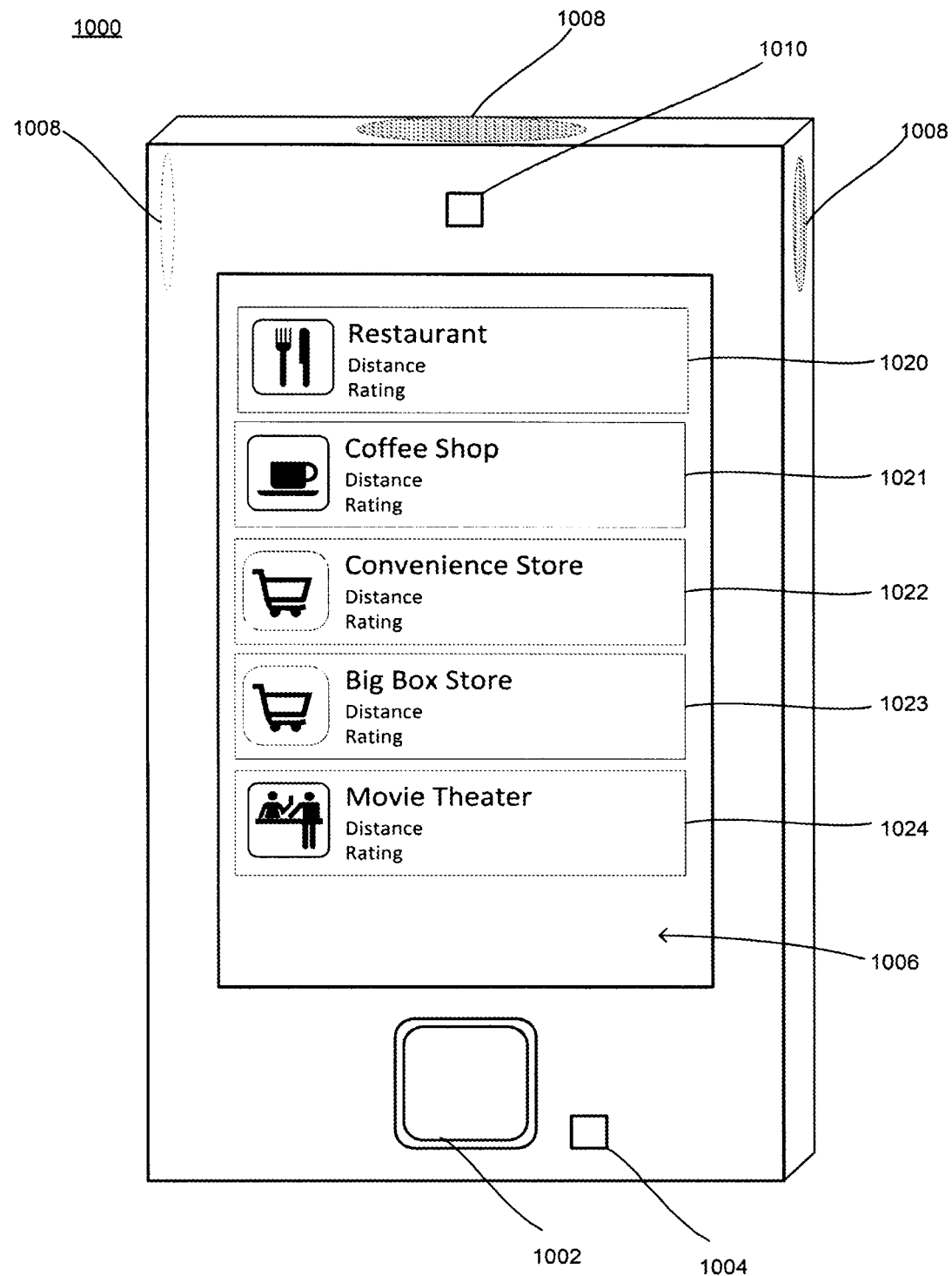
FIGS. 10A-10C are pictorial diagrams illustrating information regarding the points of interest according to aspects of the disclosure.

As shown in FIG. 10A, the information regarding the points of interest may be shown via the display on the device. Device 1000 may be similar to device 300. For example, device 1000 may include an input 1002, a microphone 1004, a display 1006, one or more image sensors 1008, and an output 1010. These features may be similar to those discussed herein with respect to device 300.

The device may provide information regarding the points of interest to the user, for instance, by overlaying the information on the home screen, or display 1006, of the device. The information may be provided in a variety of different ways, such as a list, a map, annotations to a map, etc. The information may be ordered based on the relevance weights, distance to the user, highest rated point of interest, visibility etc. According to other examples, the information may be output as audio data through one or more speakers of the device or accessories paired with the device.

According to some examples, points of interest may be promoted. The point of interest may be promoted if the owner or advertiser of the point of interest pays to have the point of interest promoted. The promoted point of interest may be indicated as the most relevant point of interest due to the promotion. For example, if a point of interest is being promoted, the point of interest may be indicated as "promoted" and appear as the most relevant point of interest. The promoted point of interest may be indicated as "sponsored" or "advertisement" to indicate that the promoted point of interest may not be the most relevant point of interest based on the calculated relevant weights.

In some examples, the device may provide this information to the user with decreased or minimal user input. For example, the user may not have to open an application on the device (or even, in some examples, provide any active input) to run a search query to determine points of interest in the vicinity of the user. The device may, according to some examples, automatically (or based on a single user input) query the field of view of the image sensors to determine and provide information relating to the points of interest in the particular geographical area. Further, the device may provide more relevant results to the user based on the field of view of the image sensors and the relevance weight given to each of the plurality of points of interest.

FIG. 10A illustrates an example where the information regarding the points of interest is provided as a detailed list. Each of the points of interest may be provided as an individual place card 1020-1024, or button, on the display 1006. For example, the more relevant point of interest may be a restaurant, shown as place card 1020. Place card 1020 may include information about the restaurant, including the distance from the determined location of device and the publically available rating. The place card 1020 may be interactive, such as serving as an icon for user input to allow the user to find out more information regarding the restaurant. In some examples, the interactive place card 1020 may allow for quick actions relevant to the point of interest. For example, the system may be integrated with services for the points of interest to allow for quick actions. For a restaurant, the quick action may allow a user to make a reservation. The second most relevant point of interest may be a coffee shop, shown as place card 1021. Using the formula to calculate the relevance weight, the coffee shop may be the second most relevant due to size of the front façade, distance from the determined location of device, publically available rating, etc. A quick action for place card 1021, the coffee shop, may be to place a mobile order for coffee. For example, the quick action may allow a user to order and pay for their order without ever entering the point of interest. The third most relevant point of interest may be a convenience store, shown as place card 1022. The fourth most relevant point of interest may be a big box store, shown as place card 1023. The fifth most relevant point of interest may be a movie theater, shown as place card 1023. A quick action for place card 1023, the movie theater, may be to order movie tickets. For example, the quick action may allow a user to order tickets and select the seats for the showing. There may be more relevant points of interest than those shown on display 1006. For example, display 1006 may be touch activated such that user can provide a touch input to scroll through the list to see additional points of interest.

The order of which the places of interest appear may change as the system learns the choices of the users. The device may learn over time that users in that particular geographical area consistently choose a particular option and, therefore, the device may promote the particular option.

For example, the relevance weight formula may rank the points of interest, in order from most relevant to least relevant, as: restaurant, coffee shop, convenience store, big box store, and movie theater. However, over time, the system may learn through machine learning that, when presented with the points of interest in that order, users may select the coffee shop more often than they select the restaurant. Thus, for future queries in that location, the system may present the list of points of interest with the coffee shop being the most relevant, even if the relevance weight of the coffee shop is less than the relevance weight of restaurant.

Figure 10B:
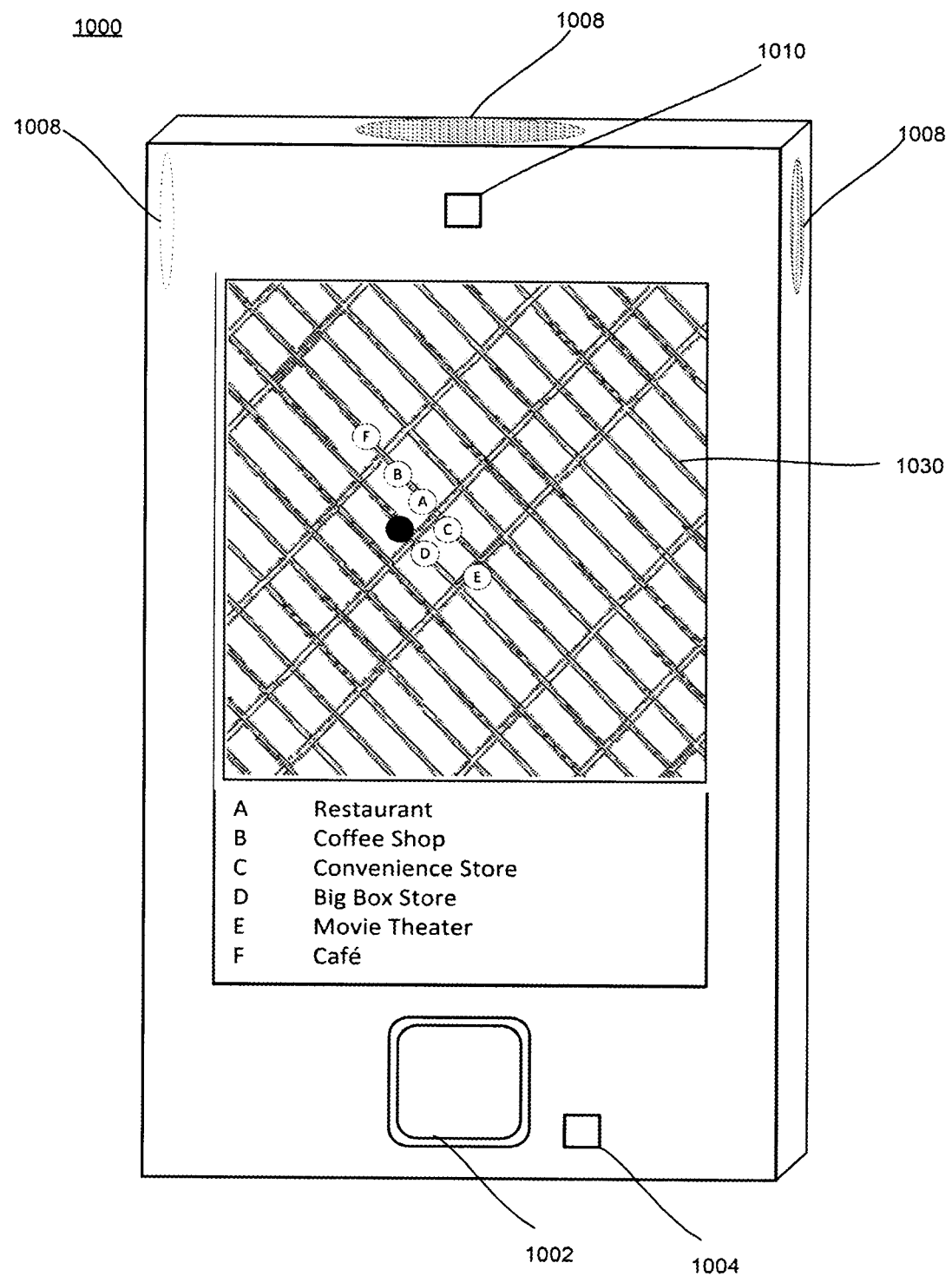

FIG. 10B illustrates an example where the information regarding the points of interest is provided as an annotated map. For example, each of the points of interest may be provided as a point A-F on map 1030. Below map 1030, information regarding points A-F may be provided. For example, the name and/or type of point of interest may be shown in relationship to the points A-F on the map. In some examples, Point A may be considered the most relevant point of interest because it is listed first. Point A on map 1030 may correspond to a restaurant, point B may correspond to a coffee shop, point C may correspond to a convenience store, point D may correspond to a big box store, point E may correspond to a movie theater, and point F may correspond to a café.

The user may be able to interact with map 1030. For example, the user may be able to zoom in and/or out on map 1030. In some examples, the user may be able to select one point A-F of the points of interest to obtain more information about that point of interest. For example, selecting one point A-F may cause information to appear on display 1006, such as the distance of the point of interest to the determined location of device, the rating of the point of interest, etc. In some examples, the user may select a point A-F from the list below map 1030, which may cause information pertaining to that point of interest to appear on display 1006.

Figure 10C:
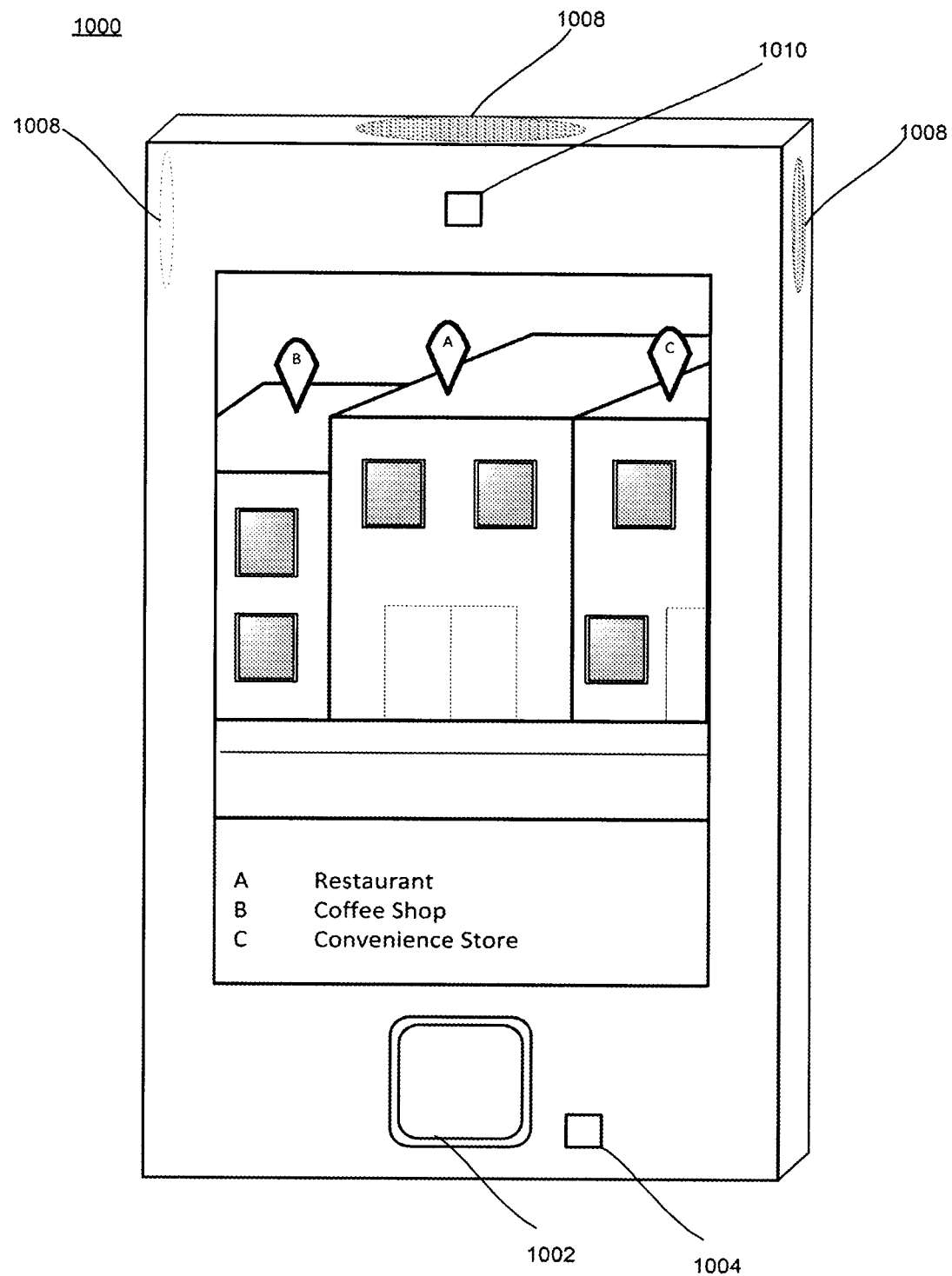

FIG. 10C illustrates another example where the information regarding the points of interest is provided on the display. As shown, a street view image 1240 of the points of interest may be provided on display 1006. Each of the points of interest may have a pin A-C identifying the point of interest. Below the street view image 1240 there may be a list of the points of interest corresponding to pins A-C. As in other examples, the user may be able to select points A-C from the street view image 1240 or from the list provided below the street view image 1240 to display more information regarding the selected point of interest.

Figure 11:
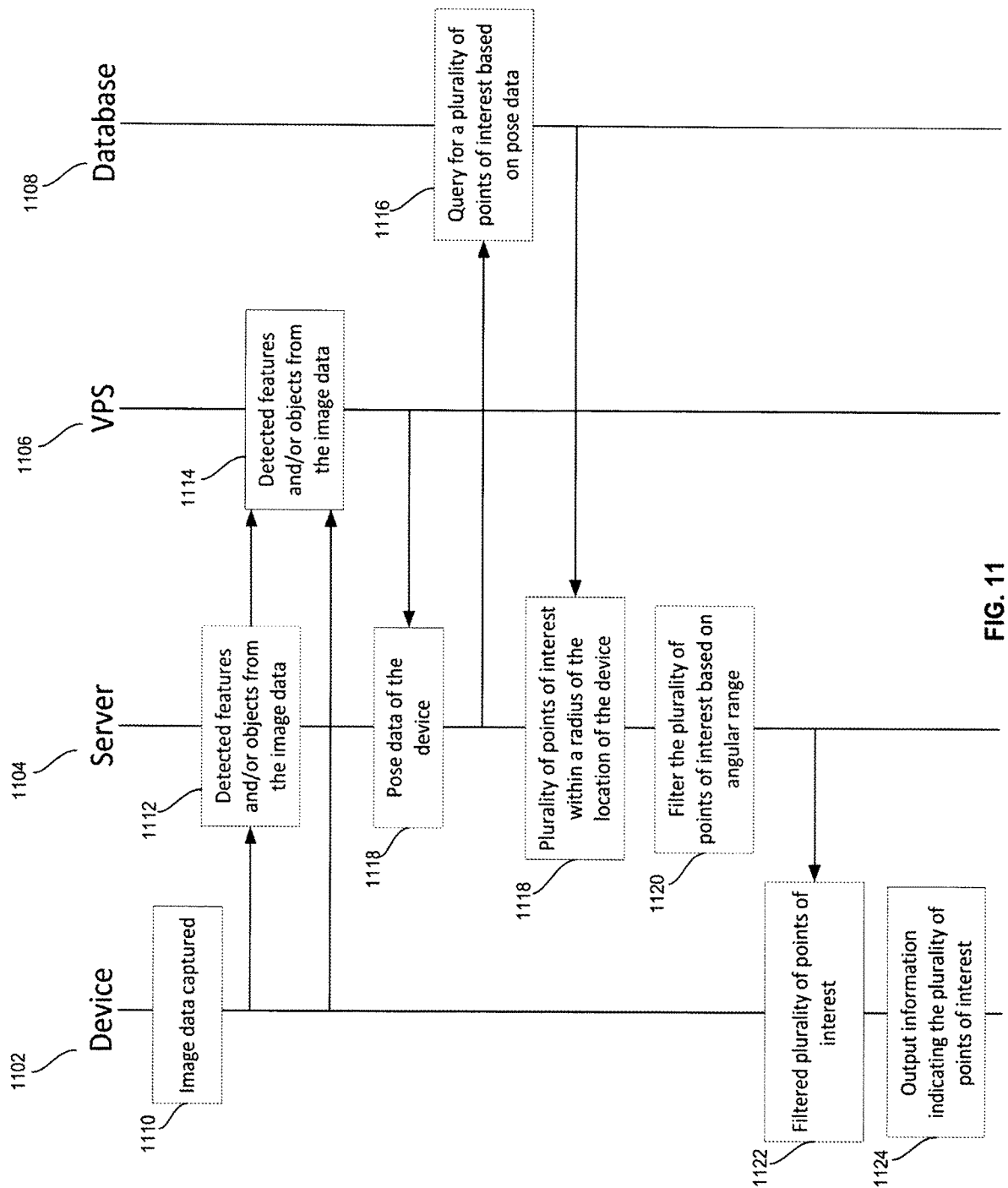
FIG. 11 is a diagram in accordance with aspects of the disclosure.

FIG. 11 illustrates a sequence of steps that may occur among device 1102, server 1104, VPS 1106, and database 1108. For example, in block 1110 image data may be sensed by one or more image sensors of the device 1102.

In blocks 1112 and 1114, features and/or object may be detected in the image data. For example, device 1102 may detect, or extract, features and/or objects from the image data. The detected features and/or objects from the image data 1112 may be sent from device 1102 to server 1104 or VPS 1106. In examples where the detected features are sent from device 1102 to server 1104, the detected features and/or objects from the image data 1114 may be sent from server 1104 to VPS 1106. In some examples, server 1104 or VPS 1106 may detect features and/or objects in the image data 1112, 1114.

In block 1118, the VPS 1106 may send the pose data of the device 1118 to server 1104. The pose data of the device 1118 may be based on the detected features and/or objects from the image data 1112, 1114 and the VPS index. For example, the VPS 1106 may determine a location and orientation of the device based on at least the detected features and/or objects from the image data 1112, 1114.

In block 1116, the pose data of the device 1118 may be used to query a mapping database for a plurality of points of interest.

In block 1118, the determined plurality of points of interest based on pose data 1116 may be sent from database 1108 to server 1104. The plurality of points of interest may be located within a radius of the location of the device 1102.

In block 1120, the plurality of points of interest may be filtered. For example, points of interest that do not fall within a certain angular range that is centered on the device orientation may be filtered out such that only points of interest within the certain angular range are returned. The certain angular range may be a point of interest search angle. The point of interest search angle may dynamically change based on the distance between the image sensors and the plurality of points of interest. In some examples, the point of interest search angle may be changed by the user. The point of interest search angle may be, for example, similar to the field of view for a user.

In some examples, the plurality of points of interest may be filtered at the VPS 1106, the server 1104, or device 1102. For example, the device 1102 may receive the plurality of points of interest within the radius and filter the plurality of points of interest based on the point of interest search angle. In another example, the server 1104 may filter the plurality of points of interest based on the point of interest search angle and sent only the filtered plurality of points of interest to the device 1102. The filtered plurality of points of interest 1122 may be provided to device 1102.

In block 1124, information indication the plurality of points of interest is provided for display on the device 1102.

Figure 12:
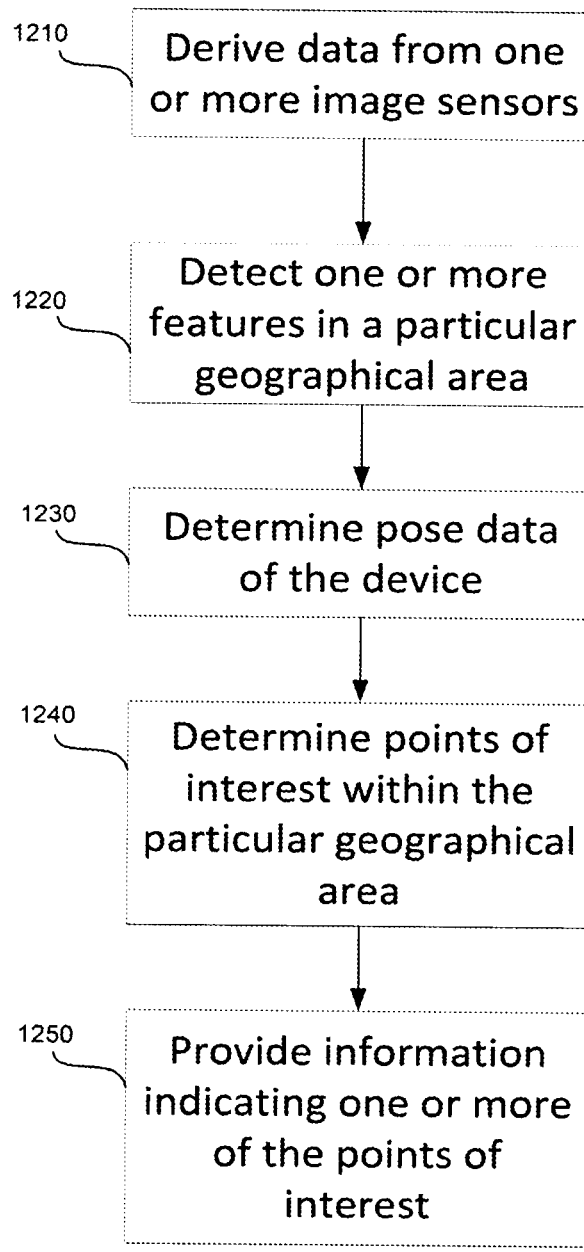
FIG. 12 is a flow diagram according to aspects of the disclosure.

FIG. 12 illustrates an example method for providing information regarding at least one point of interest in the geographical area of the device. For example, in block 1210, the system may derive data from the one or more image sensors.

In block 1220, the system may detect one or more features in a particular geographical area based on the data derived from the one or more image sensors. For example, the system may detect features and/or objects in the data derived from the one or more image sensors. The features and/or objects may include permanent and/or distinctive structures that may be useful in determining the device's location. The features and/or objects may be in the VPS index and, therefore, may have already been used to determine a location.

In block 1230, the system may determine the pose data of the device based on the detected features and/or objects. The pose data may include the location and orientation of the device. To determine the pose data, the system may use the features and/or objects captured by the image sensors in combination with a variety of other sensors. The other sensors may include a GPS sensor, an accelerometer, a gyroscope, etc. The GPS sensor, in combination with the features and/or objects detected, may determine the location of the device. The accelerometer and/or gyroscope may be used to determine the orientation of the device. The orientation of the device may include the direction the image sensors are pointing and, therefore, the direction the user is facing.

In block 1240, the system may determine points of interest within the particular geographical area based on the pose data. The geographical area may be set by a maximum distance away from the pose data, such as the location of the device. For example, the geographical area may be a 200 meter radius around the device. In some examples, the geographical area may be a three (3) block radius around the device. The determined points of interest may be locations that are visible to the image sensors and, therefore, the user.

In block 1250, the system may provide information indicating one or more of the points of interest. The system may provide this information to a display of the user device. For example, the system may provide a list, an annotated map, an annotated street view, etc. indicating the points of interest. In some examples, the system may provide audio feedback indicating the points of interest.

The points of interest may be ranked based on relevance. For example, a location that is closer to the location of the device, has been chosen more often by others, has a higher publically accessible rating, etc. may be factors in determining the relevance of the point of interest. An algorithm may be used to determine the relevance. The system may rank the points of interest based on their calculated relevance weight.

As will be appreciated, the technology described herein may enable a search for points of interest in the vicinity of the user in a manner that is less computationally intensive and requires fewer device resources than existing e.g. image matching-based techniques. The technology may also result in indications regarding points of interest in the user's vicinity being provided more quickly, with a less arduous and more intuitive user-device interaction.

The invention claimed is:

1. A system comprising:
one or more processors configured to:
detect, based on data derived from use of one or more image sensors of a user device, one or more features captured by the one or more image sensors;
determine, based on at least the one or more detected features, pose data including a location and orientation of the device;
determine, based on the pose data, a plurality of points of interest within a particular geographical area that is determined based on the pose data, wherein the geographical area is within a predefined distance of the location of the device included in the pose data or a predefined angular range that is based on the orientation of the device included in the pose data; and
provide, via the user device, information indicating one or more of the plurality of points of interest.

2. The system of claim 1, wherein the predefined angular range is wider than a field of view of the one or more image sensors.

3. The system of claim 1, wherein the predefined geographical area comprises a first geographical area that is defined by a first distance from the location of the user device and a first angular range and a second geographical area that is defined by a second distance from the location of the user device and a second angular range that is based on the orientation of the user device, wherein the first angular range is wider than the second angular range and the first distance is less than the second distance.

4. The system of claim 1, wherein the one or more image sensors are located on an edge of the user device.

5. The system of claim 1, wherein the plurality of points of interest are determined by querying a mapping database for points of interest within the particular geographical area.

6. The system of claim 5, wherein the plurality of points of interest are determined by querying the mapping database for points of interest within a particular range from the location, and the returned points of interest are filtered such that points of interest outside an angular range that is centered on the orientation of the device are excluded.

7. The system of claim 1, wherein the pose data is determined using a database of feature data generated based on a collection of street level images which depicts a geographic area that includes a sub-area in which the features captured by the one or more sensors of the device are located.

8. A method comprising:
deriving, using one or more processors, data from one or more image sensors;
detecting, using the one or more processors and based on the derived data, one or more features in a particular geographical area;
determining, using the one or more processors and based on at least the one or more detected features, pose data including a location and orientation of the device;
determining, using the one or more processors and based on the pose data, a plurality of points of interest within the particular geographical area, wherein the geographical area is within a predefined distance of the location of the device included in the pose data or a predefined angular range that is based on the orientation of the device included in the pose data; and
providing, using the one or more processors, information indicating one or more of the plurality of points of interest in response to detecting features.

9. The method of claim 8, wherein detecting the one or more features in the particular geographical area occurs without a prompt from a user at a time of the detecting.

10. The method of claim 8 further comprising determining, using the one or more processors, the plurality of points of interest based on a field of view of the image sensors.

11. The method of claim 8, further comprising computing, using the one or more processors, a relevance weight for each of the plurality of points of interest.

12. The method of claim 11, further comprising providing, using the one or more processors and based on the computed relevance weights, a ranked list of the plurality of points of interest.

13. The method of claim 11, wherein computing a relevance weight further includes using a distance group factor, a type factor, and a place rating factor.

14. The method of claim 13, wherein the distance group factor is a value determined based on a predefined distance threshold between the device and each of the plurality of points of interest.

15. The method of claim 13, wherein the type factor is a value based on a type of point of interest.

16. The method of claim 13, wherein the place rating factor is a value based on at least one publicly available rating for each of the plurality of points of interest.

17. The method of claim 8, wherein determining the pose data is further based on at least one of a GPS reading, a visual positioning system reading, and an accelerometer reading.

18. A non-transitory computer-readable medium storing instructions, which when executed by one or more processors, cause the one or more processors to:
derive data from one or more image sensors of a user device;
detect one or more features in a particular geographical area based on the derived data;
determine pose data including a location and orientation of the device based on at least the one or more detected features;

determine a plurality of points of interest within the particular geographical area based on the pose data, wherein the geographical area is within a predefined distance of the location of the device included in the pose data or a predefined angular range that is based on the orientation of the device included in the pose data; and provide information indicating one or more of the plurality of points of interest in response to detecting features.

19. The non-transitory computer-readable medium of claim 18, wherein detecting the one or more features in the particular geographical area occurs without a prompt from a user at a time of the detecting.

20. The non-transitory computer-readable medium of claim 18, further cause the one or more processors to determine the plurality of points of interest based on a field of view of the image sensors.

* * * * *